United States Patent [19]
Trett

[11] Patent Number: 5,420,430
[45] Date of Patent: May 30, 1995

[54] DETECTION SYSTEMS FOR DETECTING OBSTRUCTIONS IN DOORWAYS

[75] Inventor: John Trett, Marlow, United Kingdom

[73] Assignee: Formula Systems Ltd., Whitney, United Kingdom

[21] Appl. No.: 119,119

[22] PCT Filed: Mar. 19, 1992

[86] PCT No.: PCT/GB92/00490
§ 371 Date: Sep. 16, 1993
§ 102(e) Date: Sep. 16, 1993

[87] PCT Pub. No.: WO92/18413
PCT Pub. Date: Oct. 29, 1992

[30] Foreign Application Priority Data

Apr. 15, 1991 [GB] United Kingdom ............... 9107981

[51] Int. Cl.6 ............................................... B66B 13/26
[52] U.S. Cl. ................................. 250/341; 250/341.7; 250/349; 250/221; 49/25; 187/317
[58] Field of Search ............. 250/221, 341, 349; 187/104, 130, 52 R, 5 C, 317; 49/25

[56] References Cited

U.S. PATENT DOCUMENTS

| | | | |
|---|---|---|---|
| 3,875,403 | 4/1975 | Svenson | 250/209 |
| 4,742,337 | 5/1988 | Haag | 340/556 |
| 4,794,248 | 12/1988 | Gray | 250/221 |
| 5,149,921 | 9/1992 | Picado | 187/130 |

FOREIGN PATENT DOCUMENTS 3620227 8/1987 Germany.
8703100 5/1987 WIPO.

OTHER PUBLICATIONS

E.D.S. Microscan "S" Entrance Detector Screen, Brochure and Manual, T. L. Jones Ltd., 1989.
E.D.S. Microscan "II" Entrance Detector Screen, Brochure and Manual, T. L. Jones Ltd., 1989.
Lambda 950 Infra-red Door Protection Device, Brochure and Field Instructions, Otis Elevator Company, 1983–1984.
Enhanced Lambda 950 Infra-red Door Protection Device, Field Education Article, Otis Elevator Company, 1988.
Lambda 950 Infra-red Door Protection Device, Brochure, Otis Elevator Company, undated.
Panaseer Model 145 Door Safety System, Brochure, Memco Ltd., undated.

*Primary Examiner*—Carolyn E. Fields
*Attorney, Agent, or Firm*—Christie, Parker & Hale

[57] ABSTRACT

A detection system includes an infrared emitter (2) and an infrared detector (8) having optical axes (6) and (12) extending parallel to one another but being offset from one another. As the detector (8) and the emitter (2) approach one another the distance between them decreases but their angular separation increases. Accordingly, the increase in signal engendered in the detector as it approaches the emitter is countered to some extent by the greater angular separation. Accordingly, the net result is that any change in output of the detector resulting from a change in its spacing from the emitter is substantially reduced. Instead of the detector and emitter moving relative to one another they may be fixed and the light path between them varied by a moving reflector to achieve a similar result.

21 Claims, 4 Drawing Sheets

DETECTION SYSTEMS FOR DETECTING OBSTRUCTIONS IN DOORWAYS

BACKGROUND OF THE INVENTION

The present invention relates to detection systems.

Detection systems have been used for detecting the presence of an obstruction in a lift doorway. In the most fundamental form an infrared transmitter is mounted on one side of the doorway and infrared detector is mounted on the other side of the doorway on the leading edge of the door. The optical axis of the transmitter is aligned with the optical axis of the receiver and so a light beam extends across the doorway from the transmitter to the receiver. The receiver thus generates an output signal indicative that the doorway is clear. When an obstruction interrupts the beam, the output from the detector changes to indicate the presence of an obstruction and control means are activated to stop the movement of the door and/or reverse the direction of movement.

The problem with this arrangement is that as the distance between the detector and the emitter decreases, the intensity of the light received by the detector increases very significantly. If an obstruction entering the doorway during the last stages of closure is slightly translucent eg a human hand, then light passing through the hand will be detected by the detector and so the door will continue to close on the hand. The problem has, to some extent, been overcome by providing additional circuitry which acts to reduce either the beam intensity of the emitter or the sensitivity of the detector as the door approaches closure. This is still unsatisfactory firstly, because only a step wise reduction is achieved and, secondly, because costly additional circuitry is required.

It is an object of the invention to provide an improved detection system.

SUMMARY OF THE INVENTION

According to the present invention there is provided a detection system comprising an emitter for emitting a beam of radiation, a detector for detecting the radiation of the emitter, and means for varying the radiation path length between the emitter and detector in response to a moving object and simultaneously varying the angle that the radiation path makes with at least one of the optical axes of the emitter and the detector, the radiation intensity transmitted by the emitter towards the detector being arranged to vary as a function of said angle in a sense such, that as the length of the radiation path progressively reduces, the radiation intensity at least during the final stage of closure and path length reduction emitted along said path to the detector decreases.

According to the present invention there is further provided a detection system comprising an emitter for emitting a divergent beam of radiation, a detector having a divergent field of view, the emitter and detector being constrained for relative movement so that the optical axis of the divergent beam and the optical axis of the divergent field of view are maintained substantially parallel to one another with a substantially predetermined spacing between the two axes, the detector being arranged to generate an output signal which is a function of both distance between the emitter and detector along said axes, and the angle between a said axis and the line joining the emitter to the detector, so that as a reduction in the distance between the emitter and detector acts to increase the output signal of the detector, an increase in angle acts to reduce the output signal.

BRIEF DESCRIPTION OF THE DRAWINGS

Detection systems embodying the present invention will now be described, by way of example, with reference to the accompanying diagrammatic drawings, in which.

DETAILED DESCRIPTION

Figure 1:
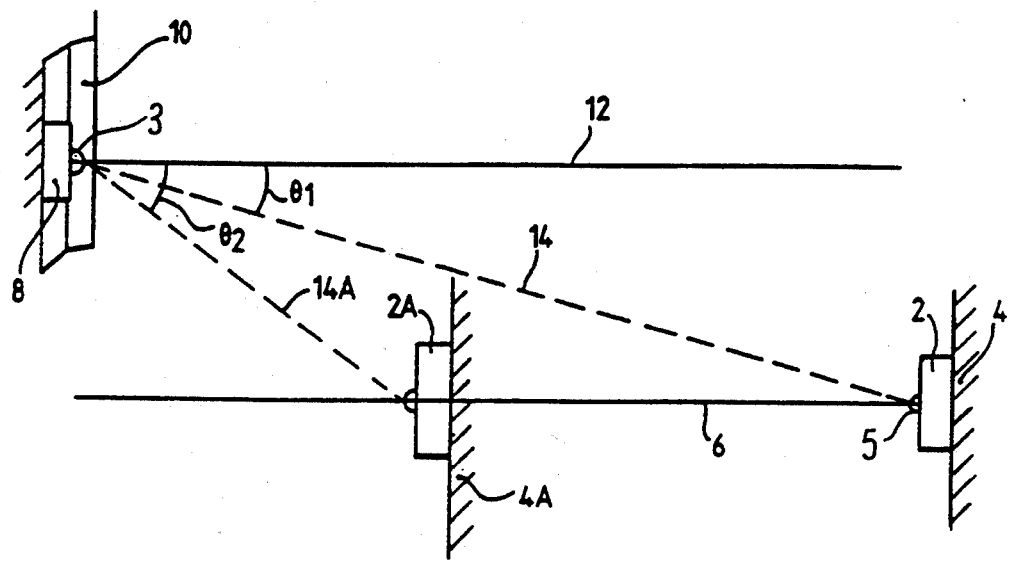
FIG. 1 is a side elevation of one system.

As shown in FIG. 1 an infrared light emitter 2 is mounted on the leading edge of a lift door 4. The optical axis 6 of the emitter extends at right angles to the door and across the door opening. An infrared detector 8 is mounted on a slam post 10 on the opposite side of opening to the leading edge of the door. The optical axis 12 of the detection zone of the detector 8 extends at right angles to the slam post 10 and across the opening. The optical axes 6 and 12 extend parallel to one another but lie spaced apart by a predetermined distance. The optical axis of the emitter is the axis along which the output is a maximum. The optical axis of the detector is the axis along which the sensitivity is a maximum. The emitter 12 is designed to emit a wide beam of light, the light being most intense along the optical axis 6 and diminishing in intensity with distance from the optical axis.

Figure 3:
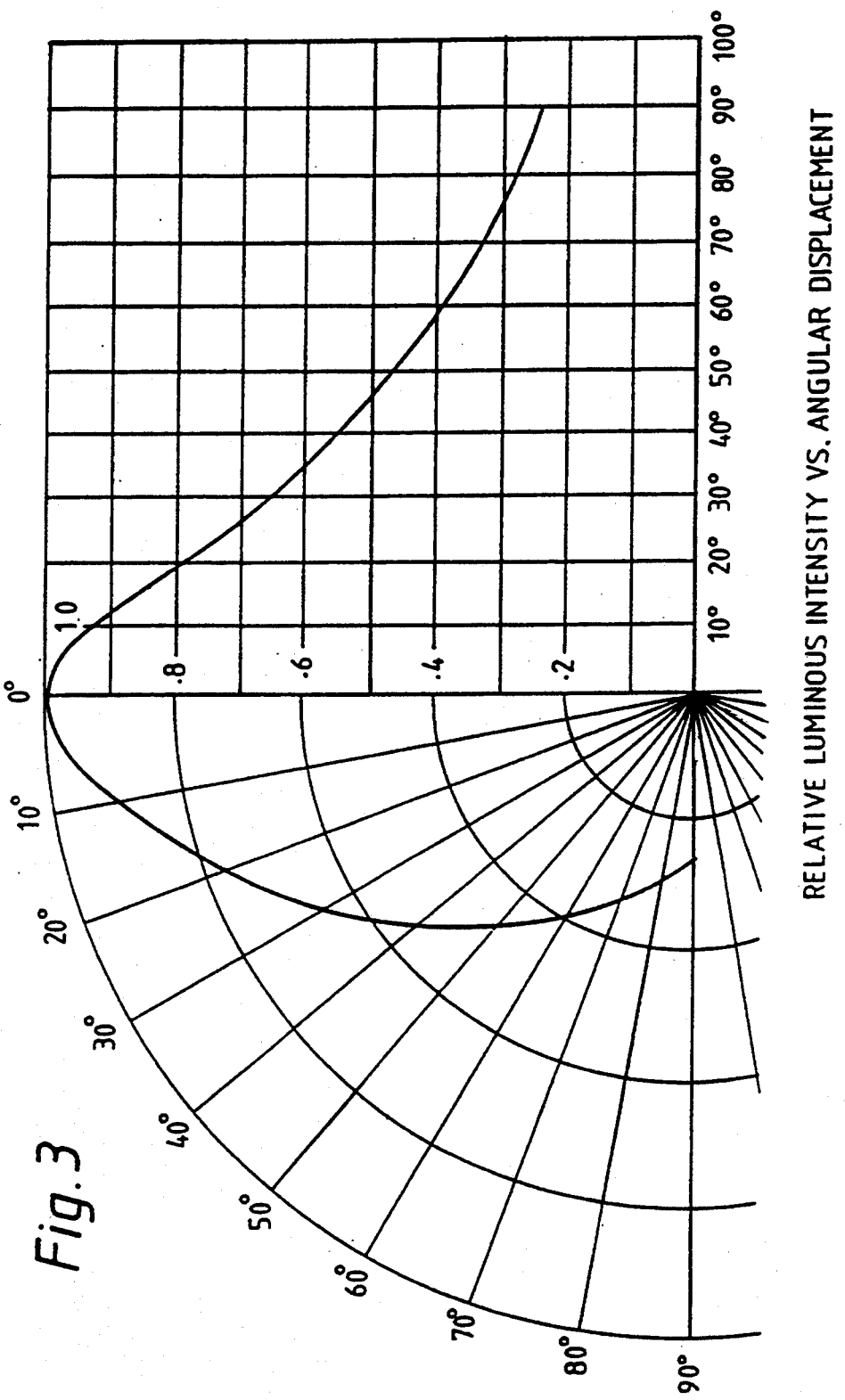
FIG. 3 is a polar and coordinate graph of light intensity versus angular displacement for an infrared emitter.

FIG. 3 shows one example of both a polar and a coordinate graph of relative luminous intensity versus angular displacement. As can be seen from the graph, the maximum intensity of 1.00 is along the optical or vertical axis of the graph. The intensity then diminishes with angular displacement from the optical axis reducing to 0.5 or half the maximum intensity at an angle of 45°. That is to say that on any given point on the optical axis of the graph the optical intensity is reduced to half by moving to a point on a line which makes 45° with the optical axis and which lies the same distance from the emitter.

Preferably the polar characteristic of either the emitter or detector or both, is such that the light intensity reduces to below 60% of the light at the optical axis when the angle to the optical axis is 60°. Emitters and detectors having other polar characteristics can be used.

In operation starting with the door 4 wide open, the line 14 joining the emitter 8 to the detector 2 makes an angle of $\theta_1$ with the optical axis 12. As the door moves towards closure to reach the position 4A, the distance between the emitter and detector is reduced but the angle of $\theta_2$ between the line 14A and the optical axis 12 will have increased. These two factors act in opposite senses. The diminishment of the distance between the emitter and the detector acts to increase the light intensity received by the detector. However, the increase in angle from $\theta_1$ to $\theta_2$ acts to reduce the light intensity of the light received by the detector.

Figure 2:
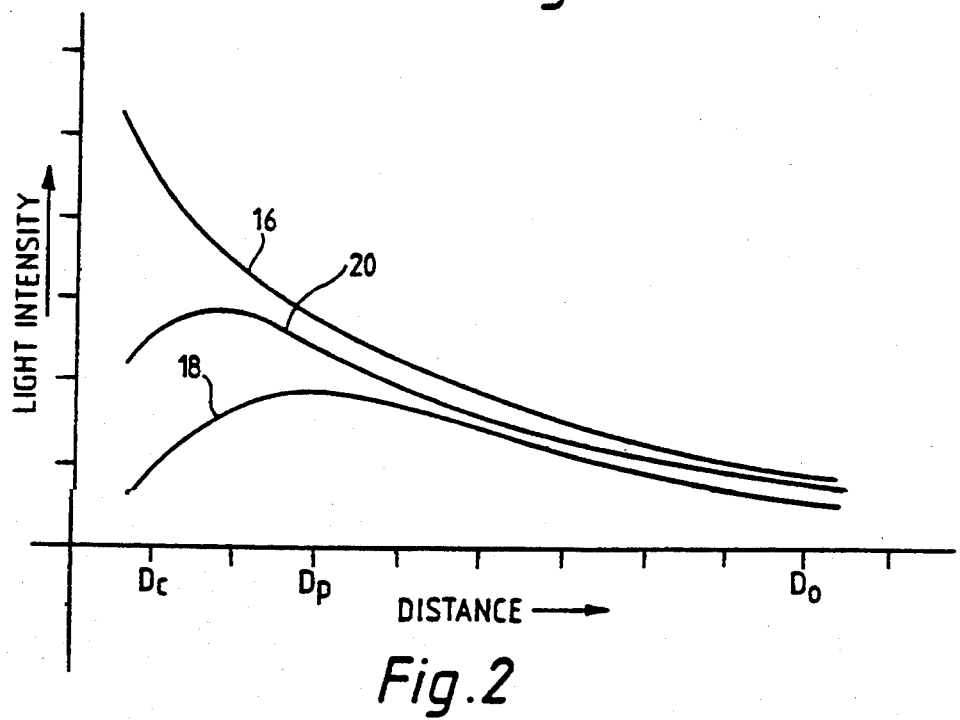
FIG. 2 is a graph of distance versus light intensity.

Graph 18 of FIG. 2 shows the light intensity detected by the detector versus distance from the emitter. As can be seen as the distance reduces from Do (where the door is wide open) towards closure, the light intensity increases progressively to reach a peak or maximum level at a distance apart Dp whereafter the intensity reduces to a minimum at distance apart Dc (where the door is closed). Under optimum conditions the light intensity (and thus, the output signal of the detector) at Dc and Do should be the same and the intensity at Dp should only be minimally greater (no more than 60 dB of the intensity at Dc and Do).

If the spacing between the two optical axes is reduced by say half a beneficial effect is still produced (see graph 20) but the difference between maximum and minimum output signals is increased to about 50%.

Graph 16 by contrast shows the light intensity detected when the optical axis 12 is moved to be level or colinear with the optical axis 6 as is the situation in the prior art. As can be seen the intensity increases progressively as the distance shortens from Do to Dc with no peaking.

The required spacing between the axes 6 and 12 is determined by the optical profile of the detector and/or emitter. Basically, if the beam emitted by the emitter is a narrow angle cone or the detection zone of the detector is a narrow angle cone then the spacing between the axes 6 and 12 can be reduced and vice versa.

The object is to arrange the characteristics of the emitter and/or detector and the spacing between their axes such that the output signal from the detector is substantially constant as the door opens or closes.

Because the emitter and detector are vertically offset from one another, the protection secured as the gap between the door and slam post reaches a minimum is improved. This is because the detection zone is no longer just across the gap but is directed more along the gap because of the vertical offset of the emitter and detector.

Figure 4:
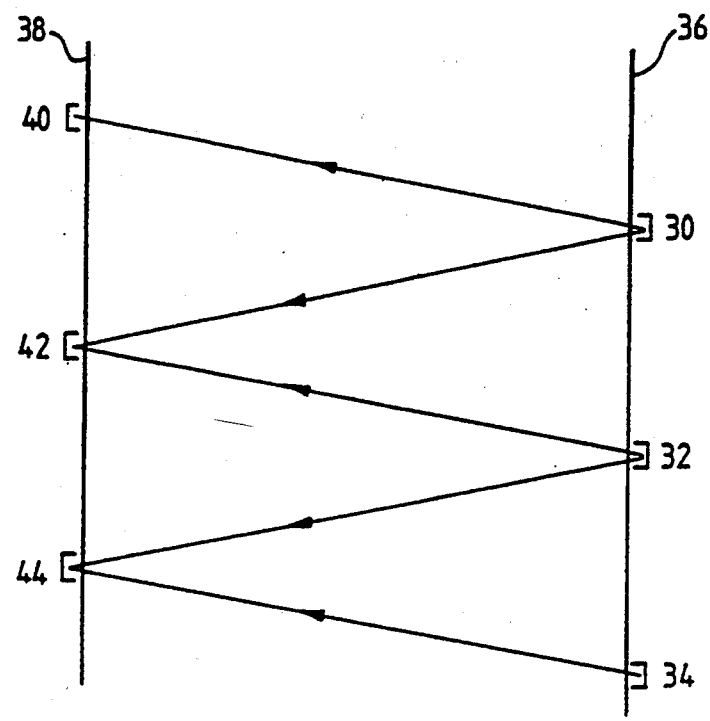
FIG. 4 is a side elevation of another system.
Figure 5:
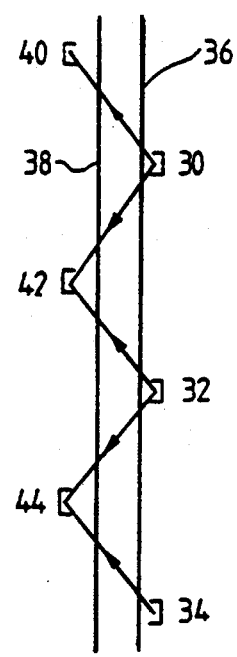
FIG. 5 is a side elevation of the system of FIG. 4 when the emitters and detectors are close together.

It will be appreciated that an array of detectors and emitters can be installed along the slam post and leading edge of the door. As can be seen in FIG. 4 three emitters 30, 32 and 34 are provided at spaced intervals along the door 36 and three detectors 40, 42 and 44 are provided along the slam post 38. The vertical off-set between the emitter and detector axes is set to meet the criteria described in connection with FIG. 1. The beam of the emitter 30 is wide enough to impinge on two adjacent detectors 40 and 42, and the beam of emitter 32 is wide enough to impinge upon two adjacent detectors 42 and 44. Using suitable switch circuits to switch alternate and intervening emitters ON and OFF sequentially, each detector will receive a signal from only one emitter at any one time. It will be appreciated that with this arrangement the same protection can be achieved as with a conventional detection array but using virtually half the numbers of emitters and detectors. A further advantage arises when the door 36 is approaching the slam post 38. As can be seen from FIG. 4 the effective detection beams run more along the gap than across the gap and so can detect narrow fingers in the gap which might otherwise go undetected since the diameter of a finger is generally narrower than the spacing between adjacent detectors.

Figure 6:
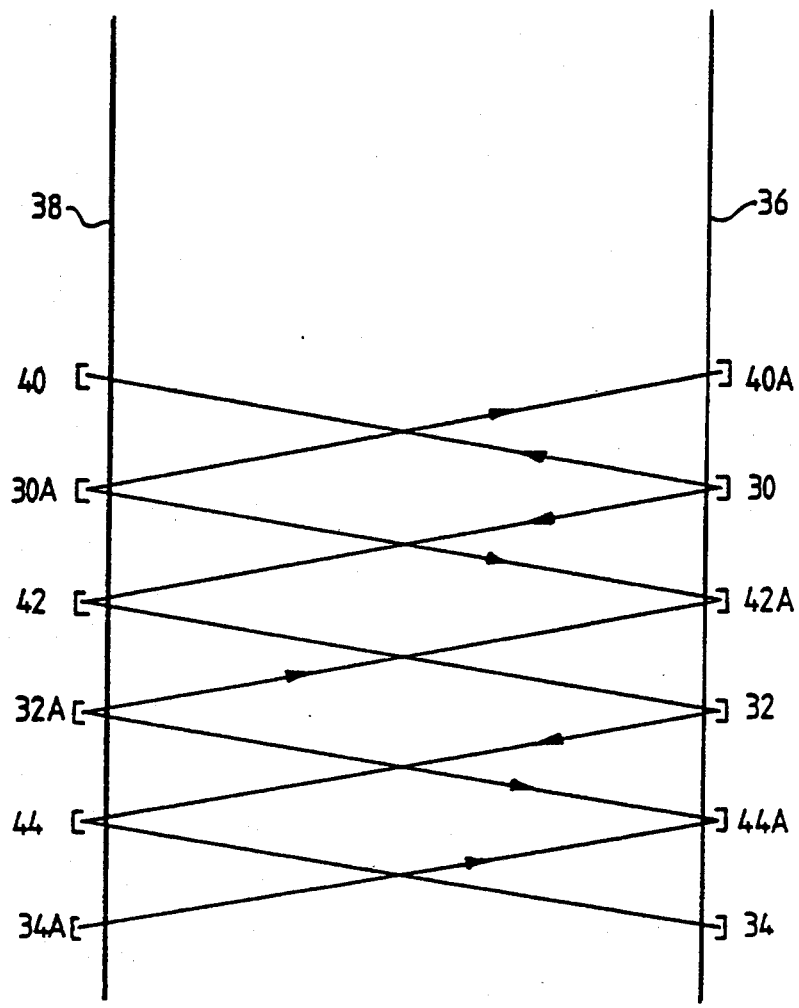
FIG. 6 is a side elevation of yet another system.

In a modification shown in FIG. 6 like parts in FIG. 4 are similarly referenced. In addition to the three emitters 30,32,34 and the three detectors 40,42,44, three further emitters 30A,32A,34A and three further detectors 40A,42A,44A are provided.

Each emitter 30A,32A,34A is mounted on the slam post 38 to face a corresponding emitter 30,32,34 and each detector 40A,42A,44A is mounted on the leading edge of the door 36 to face a corresponding detector 40,42,44. The detection beams are accordingly interlaced. If the emitter/detector set 30A,32A,34A and 40A,42A,44A is independently operated this provides security in the even of one set failing. The provision of two emitter/detector sets halves the pitch between detection beams.

In yet another modification all the emitters can be mounted one side and all the detectors mounted on the other side.

While the emitter and detectors have been described as infrared emitters and detectors it will be appreciated that emitters and detectors of other radiation can be used for example ultra sonic radiation.

Figure 7:
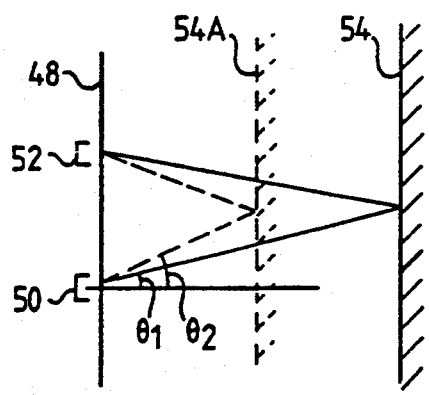
FIG. 7 is a side elevation of a further system.

In the arrangement shown in FIG. 7, both the emitter 50 and detector 52 are mounted in side by side spaced relationship on the slam post 48 of a lift doorway. A reflector 54 is mounted on the leading edge of the lift door. The optical axes of the emitter and detector extend parallel to one another. With the door wide open as shown in FIG. 7 the light beam from the emitter makes an angle $\theta_1$ with respect to the optical axis of the emitter. As the door closes and the reflector reaches the position 54A shown in FIG. 7, the angle changes to $\theta_2$. The effect achieved is precisely the same as described in conjunction with the system of FIG. 1. In each case the length of the light path between the emitter and detector is changed only in the case of FIG. 7 both emitter and detector are constrained against relative movement.

In the case of all the detector systems described, the optical characteristics of at least one of the emitter, detector and reflector must be such that the light intensity diminishes with distance from the optical axis. This can be achieved by using an appropriately profiled lens 3 in conjunction with the relevant component or components. Instead the same effect can be achieved by using an appropriately graded diffuser 5 in conjunction with the relevant component or components.

By using a custom designed polar profile for the lens or diffuser an optimum result can be achieved, ie the signal detected by the detector remains constant irrespective of the length of the light path between the emitter and detector. For example a profiled diffusion could be added on the lens of the emitter or detector array from its axis. However, for most practical purposes it is sufficient that the maximum output from the detector should occur between the maximum and minimum spacings of the emitter and detector and that such output should not exceed 60 dB of the output produced at the maximum or the minimum spacing.

While the detector system has been described in conjunction with a lift door it will be appreciated that it can be adapted for use with other safety systems, for example in connection with robots and moving vehicles.

I claim:

1. A detection system comprising an emitter for emitting a beam of radiation, a detector for detecting the radiation of the emitter, and means for varying the radiation path length between the emitter and detector in response to a moving object and simultaneously varying the angle that the radiation path makes with at least one of the optical axes of the emitter and the detector, the radiation intensity transmitted by the emitter and detected by the detector being arranged to vary as a function of said angle in a sense such, that as the length of the radiation path reduces, the radiation intensity detected by the detector progressively decreases at least during the final stage of path length reduction.

2. A system according to claim 1, wherein the polar characteristic of the beam generated by the emitter or the beam received by the detector is such that the light intensity reduces to below 60% at an angle of 60° to the optical axis of said emitter or detector.

3. A detection array including a plurality of systems each according to claim 1, wherein each emitter of each array is arranged to direct its beam of radiation to a corresponding detector of an adjacent array.

4. A detection system comprising an emitter for emitting a beam of radiation, a detector for detecting the radiation of the emitter, a reflector in the radiation path between said emitter and detector, and means for varying the radiation path length between the emitter and detector in response to a moving object and simultaneously varying the angle that the radiation path makes with at least one of the optical axes of the emitter and the detector, the radiation intensity transmitted by the emitter and detected by the detector being arranged to vary as a function of the angle in a sense such, that as the length of the radiation path reduces, the radiation intensity detected by the detector decreases.

5. A system according to claim 4, wherein said emitter and detector are constrained against relative movement but said reflector is constrained for movement relative to said emitter and detector.

6. A system according to claim 4 including a lens so profiled as to have a predetermined angle versus intensity characteristic, said lens being associated with at least one of said emitter, detector and reflector to cause the radiation intensity transmitted by the emitter and detected by the detector to vary as said function.

7. A system according to claim 4 including a diffuser having a predetermined angle versus intensity characteristic, said diffuser being associated with at least one of said emitter, detector and reflector to cause the radiation intensity transmitted by the emitter and detected by the detector to vary as said function.

8. A system according to claim 4, wherein the reflectivity of the reflector varies with said angle so as to change the intensity of light from the emitter transmitted along said path from the reflector towards the detector.

9. A detection system comprising an emitter for emitting a beam of radiation, a detector for detecting the radiation of the emitter, means for varying the radiation path length between the emitter and detector in response to a moving object and simultaneously varying the angle that the radiation path makes with at least one of the optical axes of the emitter and the detector, the radiation intensity transmitted by the emitter and detected by the detector being arranged to vary as a function of said angle in a sense such, that the radiation intensity detected by the detector peaks when the path length intermediate the maximum and minimum path lengths and wherein the peak signal detected is less than 60 dB of the signal detected when the path length is at said minimum or maximum.

10. A detection system comprising an emitter for emitting a divergent beam of radiation and a detector having a divergent field of view, the emitter and detector being constrained for relative movement so that the optical axis of the divergent beam and the optical axis of the divergent field of view are maintained substantially parallel to one another with a substantially predetermined spacing between the two axes, the detector being arranged to generate an output signal which is a function of both distance between the emitter and detector along said axes, and the angle between a said axis and the line joining the emitter to the detector so that as a reduction in the distance between the emitter and detector acts to increase the output signal of the detector, an increase in angle acts to reduce the output signal.

11. A system according to claim 10, wherein said detector and emitter are an infrared detector and emitter.

12. A system according to claim 10, wherein the polar characteristic of the beam generated by the emitter or the beam received by the detector is such that the light intensity reduces to below 60% at an angle of 60° to the optical axis of said emitter or detector.

13. A system according to claim 10, wherein the sensitivity of the detector diminishes with angular distance from its optical axis.

14. A system according to claim 10, wherein the intensity of the beam of radiation diminishes with angular distance from its optical axis.

15. A detection array including a plurality of systems each according to claim 10, wherein each emitter of each array is arranged to direct its beam of radiation to a corresponding detector of an adjacent array.

16. A detection arrangement including two arrays each according to claim 15, each emitter of one array facing a corresponding emitter of the other array and each detector of one array facing a corresponding detector of the other array.

17. A detection system comprising an emitter for emitting a divergent beam of radiation and a detector having a divergent field of view, the emitter and detector being constrained for relative movement so that the optical axis of the divergent beam and the optical axis of the divergent field of view are maintained substantially parallel to one another with a substantially predetermined spacing between the two axes, the detector being arranged to generate and output signal which is substantially equal at both maximum and minimum spacing between the emitter and detector, and which is a function of both distance between the emitter and detector along said axes, and the angle between a said axis and the line joining the emitter to the detector so that as a reduction in the distance between the emitter and detector acts to increase the output signal of the detector, an increase in angle acts to reduce the output signal.

18. A detection system comprising an emitter for emitting a divergent beam of radiation and, a detector having a divergent field of view, the emitter and detector being constrained for relative movement so that the optical axis of the divergent beam and the optical axis of the divergent field of view are maintained substantially parallel to one another with a substantially predetermined spacing between the two axes, the detector being arranged to generate an output signal in which the maximum output signal occurs between the maximum and minimum spacing between the emitter and detector and does not exceed 60 dB of the output signal produced at the maximum or the minimum spacing and which is a function of both distance between the emitter and detector along said axes, and the angle between a said axis and the line joining the emitter to the detector so that as a reduction in the distance between the emitter and detector acts to increase the output signal of the detector, an increase in angle acts to reduce the output signal.

19. A detection system comprising:
   an infrared transmitter having an optical axis and providing an output which diminishes in intensity with greater angular deviation from its optical axis;
   an infrared receiver having an optical axis and responding to received light with lesser sensitivity with greater angular deviation from its optical axis; and
   two parallel surfaces relatively movable towards and away from one another while maintaining their parallel configuration,
   said receiver mounted rigid with one said surface with its optical axis directed at the other surface, and
   said transmitter mounted rigid with the other surface with its optical axis directed at said one surface and lying substantially parallel to but spaced from the optical axis of the receiver and in optical communication therewith.

20. A detection system comprising:
   a transmitter having a main transmission axis and providing an output which diminishes in intensity with greater angular deviation from its main transmission axis;
   a receiver having a main axis; and
   two parallel surfaces relatively movable towards and away from one another while maintaining their parallel configuration,
   said receiver mounted rigid with one said surface with its main axis directed at the other surface, and
   said transmitter mounted rigid with the other surface with its main transmission axis directed at the said one surface and lying substantially parallel to but spaced from the main axis of the receiver and in communication therewith.

21. A detection system comprising:
   a transmitter having a main transmission axis;
   a receiver having a main axis and responding to received light with lesser sensitivity with greater angular deviation from its main axis; and
   two parallel surfaces relatively movable towards and away from one another while maintaining their parallel configuration,
   said receiver mounted rigid with one said surface with its main axis directed at the other surface, and
   said transmitter mounted rigid with the other surface with its main transmission axis directed at said one surface and lying substantially parallel to but spaced from the main axis of the receiver and in communication therewith.

* * * * *